Oct. 8, 1946.  N. E. WALKER  2,409,168
DISTANT CONTROL
Filed Oct. 15, 1941  2 Sheets-Sheet 2
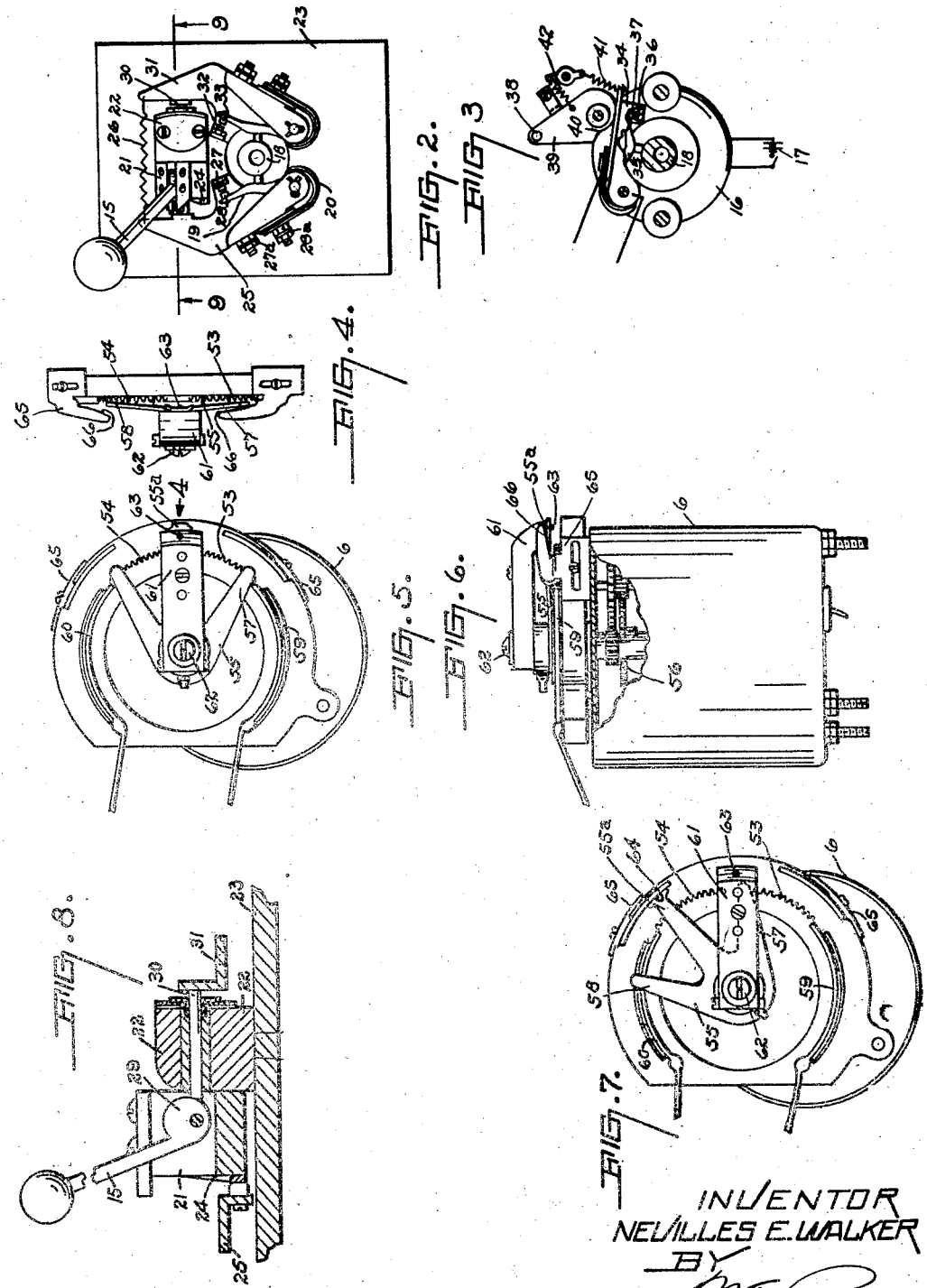
INVENTOR
NEVILLES E. WALKER
BY
ATTORNEY Patented Oct. 8, 1946

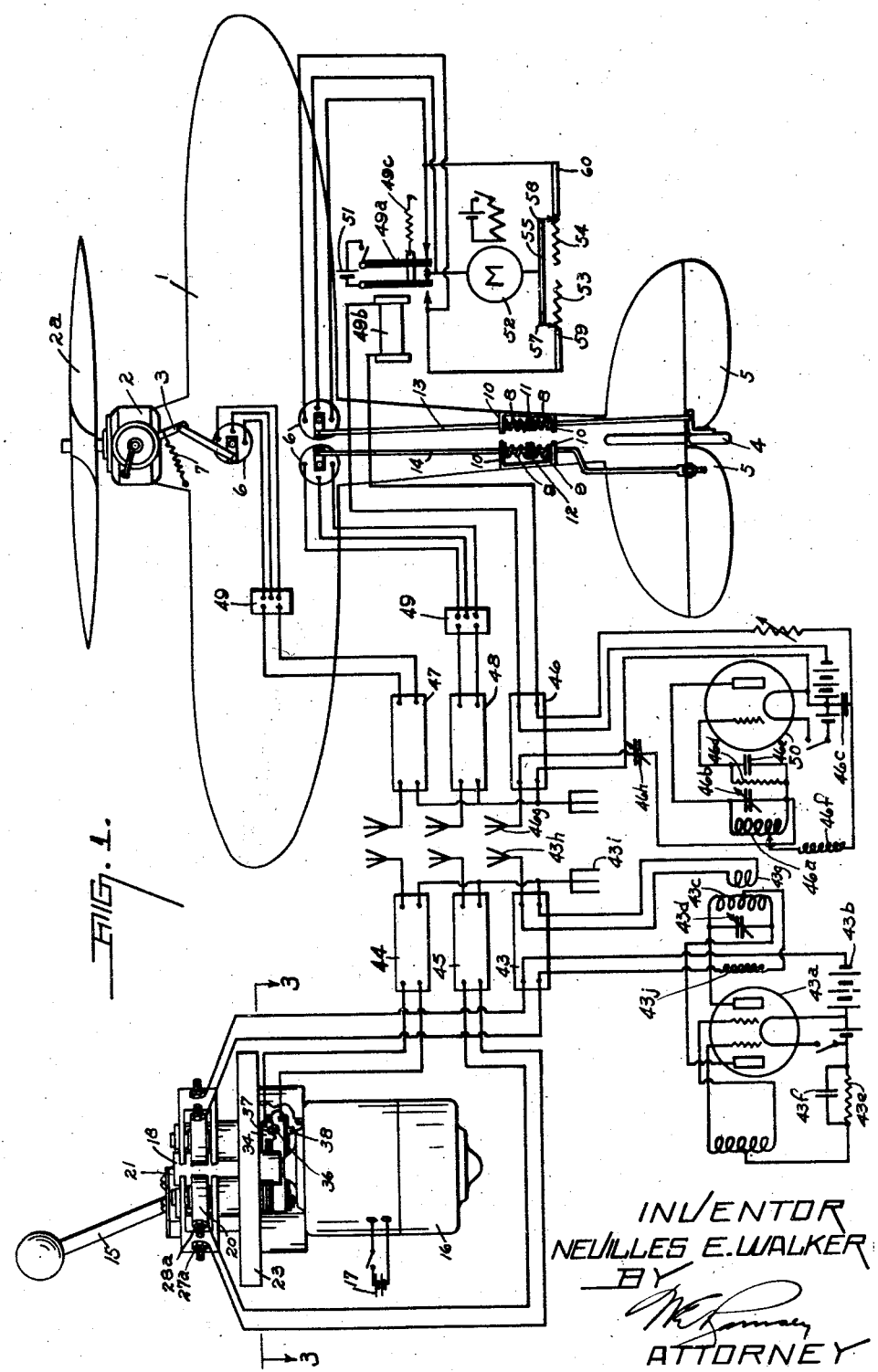

2,409,168

UNITED STATES PATENT OFFICE 2,409,168

DISTANT CONTROL

Nevilles E. Walker, Portland, Oreg.

Application October 15, 1941, Serial No. 415,109

10 Claims. (Cl. 172—282)

My invention relates to the control of distant mobile objects in which the objects are physically separated from the controls but are electrically connected. My invention thus relates, for example, to the use of radio to control the flight of airplanes, aerial torpedoes and similar devices. In this connection it is necessary that a very close control be maintained over said mobile objects and the controls must be susceptible of changing the course of said objects quickly and accurately.

One of the principal objects of my invention is to provide controls which require few electrical circuits so as to facilitate the use of radio as an intermediate transmission medium. A further object is to provide controls of this character which will respond quickly and accurately and will hold to set position.

A further and important object of my invention is to provide controls of this character which may be arranged on the ground or otherwise, and are capable of controlling the flight of an airplane or similar device by means of an electric circuit as accurately, quickly, and faithfully as if said controls were mechanically connected to said airplane controls rather than being connected therewith solely by an electric circuit. That is, said object of my invention is to provide controls which may be placed on the ground or spaced distantly from airplanes which may "fly" said airplane as certainly and faithfully as if said controls were in the hands of a pilot in said airplane.

A further object of my invention is to provide controls of this character which may be actuated by a series of electrical impulses, preferably by radio, which controls will respond to said impulses, but if other and counter impulses are imposed on said controls or operator control is otherwise lost, said controls will lock. Thus, if my invention is embodied in radio controlled airplanes or aerial torpedoes in warfare, said devices may be flown at a distance. If an enemy seeks to take over the controls by imposing on said controls a stronger impulse of proper frequency, or if the signal is otherwise rendered ineffective, the controls will lock and said airplane or aerial torpedo will continue to fly straight ahead, at level flight, and at top speed.

A further object of my invention is to provide controls of this character which may be caused to move in either of two directions under the influence of interrupted electrical impulses. Said controls respond only to the variation of duration and relative spacing of said impulses and thus be independent of frequency and the amplitude thereof.

A further object of my invention is to provide a control of this character which may be electrically balanced so that there will be no drift due to accumulation of impulses in either direction and thus the distant object controlled therefore will always follow faithfully the control lever.

A further object of my invention is to provide a control adapted for small airplanes and the like which embodies apparatus of small compass and light weight so that said apparatus may be installed in said airplane. Thus, few vacuum tubes should be used, thereby minimizing the requisite battery weight.

Other objects and details of my invention will be described with reference to the accompanying drawings, in which:

Fig. 1 is a general view of apparatus embodying my invention, certain portions of the electrical devices being shown schematically, and certain portions being shown positioned in an airplane shown diagrammatically;

Fig. 2 is a plan view of the controller shown in Fig. 1;

Fig. 3 is a horizontal section taken on the line 3—3 in Fig. 1;

Fig. 4 is a side elevation taken in the direction of the arrow 4 in Fig. 5;

Fig. 5 is a plan view of one of the control units shown in Fig. 1;

Fig. 6 is a side elevation of the control unit shown in Fig. 5;

Fig. 7 is a view similar to Fig. 5, the parts being shown in a different operating position; and Fig. 8 is a section taken on the line 9—9 in Fig. 2.

Airplane 1 is provided with a gasoline engine 2 having a speed control member 3 which is shown, for convenience, as a spark control lever but which might be a gas control device, if desired. It will be apparent to an ordinarily skilled person that this control member may be caused to shut off the ignition of engine 2 when it is slowed down, if desired. Said engine is directly connected to propeller 2a.

Airplane 1 is also provided with a rudder 4 and elevators 5. I prefer to control speed control member 3, rudder 4, and elevators 5 by three similar control units 6, each of which functions in the same way except that I prefer to arrange spring 7 so that it tends to move speed control member 3 to its full speed position, whereas springs 8 and 9 tend to move rudder 4 and elevators 5, respectively, to intermediate positions that will cause airplane 1 to fly straight forward. Springs 8 and 9 bear at their outer ends against brackets 10 affixed to airplane 1, and at their inner ends against washers 11 and 12, respectively, affixed to pushrods 13 and 14 which are connected to suitable lever arms on rudder 4 and elevators 5, respectively.

I prefer to control rudder 4 and elevators 5 by means of lever 15 which is movable in two directions like the well-known "stick" of manually controlled airplanes. To accomplish this result I provide an electrical make-and-break element adapted to make-and-break an electric circuit at more or less fixed intervals. I then vary the proportion of said intervals during which the circuit is closed. In other words, I vary the duration of each of a series of electrical impulses without varying their frequency.

Thus, referring to Figs. 1, 2, and 8, motor 16 operated by any suitable source, such as battery 17, rotates eccentric cam 18 at a speed of, say 360–400 revolutions per minute. Said cam bears against contact finger 19 causing it to move out and in against the tension of spring 20. Lever 15 is pivotally mounted in rotor 21 which is rotatably mounted in block 22 mounted on any suitable base such as panel 23. Rotor 21 has a cam face 24 arranged to move plate 25 against spring 26 to cause point 27 to contact point 28 for a longer or shorter time each time point 28 moves due to the revolution of cam 18.

Thus, movement of lever 15 in a direction that causes rotation of rotor 21 will vary the duration of the electrical impulses that flow in a circuit including points 27 and 28. Cam face 24 may, if desired, be so designed that rotation of rotor 21 in one direction will move plate 25 to the left (Fig. 2) so far that cam 18 will not open points 27 and 28 at all, in which case the aforesaid electrical impulses will be of such long duration that they occupy the whole time intervals of the revolutions of cam 18 and a continuous current will flow thru said points. On the other hand, if lever 15 be moved in the opposite direction, said impulses will become shorter and shorter until points 27 and 28 remain open continuously and no current flows. Points 27 and 28 should be made of some suitable metal, such as tungsten, and they should be insulated from each other except insofar as they are connected by an external electrical circuit. Binding posts 27a and 28a are connected to points 27 and 28, respectively.

The to and fro movement of lever 15, as viewed in Fig. 2, results in varying the duration of electrical impulses flowing thru points 27 and 28, as described, and this variation may be used to control, say, the elevators of an airplane by means hereinafter described. The rudder of the airplane may similarly be controlled by moving lever 15 in a left to right direction, as viewed in Fig. 2. It will be understood that the to and fro movement that controls the elevators is independent of the left to right movement that controls the rudder.

Lever 15 carries at its lower end a cam 29 arranged to move plunger 30, and thereby plate 31, against spring 26, thereby varying the proportion of the time points 32 and 33 remain closed in the same way that movement of plate 25 controls the opening and closing of points 27 and 28.

It is desired to provide a third pair of make-and-break points to provide controlled duration impulses to control the speed of engine 2. To this end, plate 34 carrying movable finger 35 is arranged adjacent cam 18 so that, as said cam rotates, it moves finger 35 to open and close points 36 and 37 carried by plate 34 and finger 35, respectively. Manually moving trigger 38 carried by lever 39 having an eccentric cam face 40 serves to move plate 34 against spring 41 thereby varying the proportion of the time points 36 and 37 remain closed. I prefer to so arrange the electrical circuit which includes points 36 and 37 that, when trigger 38 is released and spring 42 connected thereto retracts said trigger so that said points remain open substantially all of the time, engine 2 will operate at full speed.

The three pairs of make-and-break points thus far described, namely, 27 and 28, 32 and 33, 36 and 37, may be utilized to modulate radio transmitters 45, 43, and 44, respectively. These transmitters may be alike, and they may be of any suitable, well-known type. Therefore, a typical schematic diagram for transmitter 43 only is shown in Fig. 1, the other of said transmitters being merely indicated by rectangles. Each of said transmitters may be caused to radiate at different wave lengths, and receivers 46, 47, and 48 may be tuned to receive the signals from transmitters 43, 44, and 45, respectively.

Tube 43a may be of the RK34 type, if desired, and its anodes will be supplied with current by battery 43b thru the circuit including points 27 and 28 when said points are closed. The oscillation frequency is controlled by inductance 43c and condenser 43d, commonly called the tank circuit. Grid bias for tube 43a is provided by the conventional gridleak 43e and condenser 43f. The radio frequency energy from this transmitter is transferred to pickup coil 43g which is inductively coupled to tank coil 43c and which is connected to antenna 43h and counterpoise 43i. A radio frequency choke 43j tends to restrict the radio frequency energy to the desired paths.

The equipment to the left of antenna 43h (Fig. 1) will be located wherever the operator is stationed; that to the right, in the airplane. The receivers may be of any suitable, well-known type, a schematic diagram for receiver 46 only being shown in Fig. 1, the other of said receivers being merely indicated by rectangles. I prefer to operate tube 50 as a self-quenching, super-regenerative detector, said tube thus functioning somewhat like a thyratron. Inductance 46a and variable condenser 46b serve as a radio frequency tuning circuit, whereas the inductance of relay 49 together with condenser 46c fixes the frequency at which tube 50 oscillates when no signal is received. Gridleak 46d and condenser 46e properly bias the grid of said tube, and radio frequency choke 46f prevents radio frequency currents flowing away from the tuning circuit. The leads connecting condenser 46c to relay 49 may advantageously be made quite short. Radio frequency signals induced in antenna 46g are transferred to the tuning circuit by condenser 46h.

In the operation of my invention, as for controlling a distant airplane, it is desirable that a definite position of the airplane controls shall follow the movement of the controller to a given position regardless of the strength of the radio signal received. In other words, it would be objectionable to have the control system function differently when the airplane is at different distances. Therefore, I prefer to provide each of said receivers with a radio tube of the type in which a predetermined signal applied to its grid causes an abrupt change in plate current, stronger signals applied to the grid producing no substantially different effect. Thyratron tubes are of this type, the RK-62 tube sold by the Raytheon Manufacturing Company being satisfactory.

Thus, when a radio signal of any strength above that required to produce an abrupt plate current change in one of the aforesaid receivers is being received, reliable remote control will be accomplished. If an ordinary radio tube were used in the receiver, whereby the plate current would be roughly proportional to the received signal, a somewhat similar result would be achieved due to the relay. Signals stronger than that necessary to actuate the relay would produce equal results. But there would then be a range of signal strengths in which the operation of the relay would be uncertain. I prefer to use a thyratron type tube to actuate the relay thus assuring positive operation at all signal strengths above a definite minimum.

Having described means whereby a series of electrical impulses may be produced and transmitted to a receiver to actuate a relay, the duration of the impulses and hence of the time the relay is closed in one direction being adjustable manually at the transmitter, I will now describe the means that I prefer for causing the control unit to assume a definite position for each length of impulse thereby achieving my broad object of providing a remote control device wherein a given movement of a control element will result in a predetermined movement of a distant motor driven actuating element. Each of control units 6 is alike, so I have shown the mechanism thereof schematically in Fig. 1 for only one unit, the remainder of said units being shown merely by circles, mechanical details of one of said units being shown in Figs. 4 to 7.

I prefer relay 49 to be of the double pole, double throw type, the armatures 49a being pulled in one direction by the magnetic pull of electro-magnet 49b, and in the other direction by spring 49c. When an impulse is being received by tube 50, if that tube is of the RK-62 type arranged as I prefer in a well-known manner, the plate current will be small and relay 49 will not be energized, its armatures 49a being held in their right-hand position, as viewed in Fig. 1 by spring 49c. If a different tube should be used whereby the plate current is a maximum when an impulse is being received, said relay will be in its left-hand position during an impulse.

In its right-hand position, relay 49 serves to connect battery 51 to motor 52 in a certain way to cause rotation in a certain direction. Then, during the interval between impulses, the relay armatures are pulled to the left and polarity is reversed to cause motor 52 to reverse. I prefer to provide several impulses per second so that motor 52 will tend to reverse several times per second, and if its rotor be sufficiently light in weight, it may actually reverse at this rate. If lever 15 be placed in such a position that the duration of the impulses is just equal to the interval between them, motor 52 would merely oscillate slightly without a net movement in either direction. If the impulses are longer than the intervals, the motor will rotate in the direction in which it tends to rotate during an impulse. On the other hand, if the impulses be made shorter than the intervals, the motor will rotate in the opposite direction.

As thus far described, my invention will not serve my purpose of providing an automatic remote control device inasmuch as motor 52 will not automatically come to rest in a position determined by the position of lever 15. It would be necessary for the operator consciously to stop the motor. However, I provide variable resistors 53 and 54, one of which is introduced in series with motor 52 by rotatable contact 55 driven by said motor thru gear train 56 when said motor rotates in one direction to move said contact from its middle position, the other of said resistors being similarly introduced in the motor circuit when said contact is moved from its middle position by opposite rotation of said motor.

Suppose motor 52 starts when contact 55 is in its middle position, with long impulses predominating over shorter intervals between impulses to cause said motor to rotate in a certain direction. As said motor rotates, more and more resistance will be introduced into its circuit until it stops, the place where it stops being determined by the length of the impulses relative to the length of the intervals between them. Since the length of impulses depends on the position of lever 15, the position of contact 55 will thus be determined by the position of lever 15, and my purpose of providing an automatic remote control is achieved.

Of course, an exactly similar result would have been obtained if lever 15 had been moved in the opposite direction to give shorter impulses; motor 52 would then have rotated in the opposite direction because battery 51 would have been connected to it oppositely by relay 49 for a majority of the time, the net rotative force serving to rotate the motor until enough resistance is in series with it to stop further movement. The net rotative force depends on the relative length of impulses and intervals between impulses, one predominating over the other, and the amount the motor rotates is determined by the amount of resistance necessary to equalize the opposite rotative forces.

After contact 55 has come to rest, lever 15 may be moved to cause said contact to move further from its middle position, the net rotative force due to the long impulses being increased by further lengthening said impulses and at the same time shortening the intervals between them during which motor 52 tends to rotate oppositely. On the other hand, if contact 55 is not in its middle position and lever 15 is moved toward its middle position, the net rotative force will be reversed since the impulses will be shortened and the interval between them lengthened. This reversed net rotative force will then serve to cause motor 52 to rotate to move contact 55 toward its middle position until the opposite rotative forces are equalized due to the reduction of resistance in series with said motor.

It will be apparent (Fig. 1) that resistors 53 and 54 may be connected together at their adjacent ends without in any way changing the normal operation of my invention, since the junction thus formed would be short-circuited by contact 55. However, a different and less desirable result would ensue if contact 55 were made a single contact. Then some resistance would always be present in series with motor 52 and its rotation in the direction moving contact 55 toward its middle position would be unnecessarily sluggish.

I prefer contact 55 to be a double contact, having points 57 and 58 spaced apart a distance substantially equal to the length of resistors 53 and 54 combined. I then provide contact bars 59 and 60 connected in series with resistors 53 and 54, respectively, and arranged so that points 57 and 58 may slide upon, and make contact with them.

Thus, when motor 52 rotates to move contact 55 in one direction thereby introducing resistance in the circuit causing said rotation, the circuit that tends to cause rotation in the opposite direction will have no resistance in it because one of said contact points will have left its resistor and moved along one of said bars. Then, when lever 15 is moved toward its middle position, contact 55 will quickly follow it toward its middle position because the motor circuit that causes it to move in this direction will be without resistance. When contact 55 moves oppositely from its middle position, the opposite circuit will be without resistance and it is this circuit that will tend to move said contact back to its middle position.

Proper functioning of my invention requires that rotation of motor 52 away from its middle position shall be self-limiting by introducing resistance in series with said motor; otherwise the remote control will not be automatic. But resistance in the circuit tending to cause rotation in the opposite direction is unnecessary and may advantageously be eliminated. This result is achieved by my preferred construction wherein contact 55 is provided with two points 57 and 58 connected together electrically but spaced apart a distance equal to the combined length of resistors 53 and 54.

I will now describe a different and even more important advantage of the aforesaid motor control system. In the apparatus hereinbefore described, contact 55 will faithfully follow the movements of lever 15, which is the desired result, as long as contact 55 is not required to move an unduly large mechanical load. Now suppose that such a load prevents the full movement of contact 55 required to follow lever 15, so that the position of contact 55 no longer corresponds to that of lever 15. It is desirable that such a condition be automatically corrected, and this will be achieved as follows:

I prefer to so arrange lever 15 that the duration of the impulses will just equal the length of the intervals between impulses when said lever is in substantially its middle position. Then when lever 15 is in its middle position, contact 55 should also be in its middle position. If contact 55 should be in another, false position, it will tend to move to its middle position since the two circuits tending to rotate motor 52 in opposite directions will be connected to said motor for equal times, but one of said circuits will include resistance whereas the other will be without resistance, its rotative force will predominate over that of the circuit including resistance, and it will move contact 55 to its middle position. Thus, in controlling a distant airplane, if the controlled unit should fail briefly to follow faithfully the movement of lever 15 thereby assuming temporarily a false position, it will automatically resume a true position because of said balanced circuits.

It is desirable that the movement of operating controls be limited to their useful range. It is a matter of considerable difficulty to accomplish this result without disturbing the position of contact 55 relative to that of lever 15. I prefer to provide an arm 61 pivoted about shaft 62 to which a central member 55a of contact 55 is attached, a pin 63 carried by arm 61 being adapted to engage hole 64 in central member 55a to cause said arm 61 to rotate with said contact. At the end of the desired travel of said arm and contact, I arrange lugs 65 having cam faces 66.

When contact 55 approaches the limit of its desired travel (Fig. 7) central member 55a is slightly depressed by said cam face thereby disengaging hole 64 from pin 63 and permitting arm 61 to be moved to its middle position by springs 8, arm 61 being connected to pushrod 13. The operator will thus lose control of rudder 5 momentarily, but he may regain its control by merely moving lever 15 to its middle position whereupon hole 64 in contact 55 will re-engage pin 63. To facilitate said re-engagement when contact 55 resumes its middle position, the portions thereof adjacent hole 64 may be bent to a rounded form. The pin-and-hole connection thus serves as a clutch mechanism automatically disengageable at the limits of travel and automatically engageable at mid-point.

After arm 61 has thus been released from the member of contact 55, said contact may continue to move away from its middle point due to an inadvertent manipulation of lever 15. When said contact reaches the inner end of resistor 53 or 54 and passes to the blank space between them, the circuit actuating motor 52 will be broken and said motor will not rotate further away from its middle position, although it will rotate in the opposite direction when lever 15 is moved toward its middle position. This stopping of motor 52 while lever 15 continues to move will result in contact 55 occupying a false position with respect to lever 15. But when said contact is moved to its middle position to re-engage arm 61, said arm and contact will again occupy a true position, that is, contact 55 will be in its middle position when lever 15 is in its middle position.

My invention may be used to control aircraft used in warfare wherein an enemy may seek to disturb the operation of my control system by sending forth a strong signal that will continuously actuate receivers 46, 47, and 48. It is possible also that radio contact may be lost for any of a number of reasons such as failure of signal or radio receiving apparatus. In such case, I prefer to have the aircraft fly straight ahead, level and at full speed for two reasons. First, the aircraft will then be in less danger of being damaged and if it is aimed at a mark may better strike said mark. Second, the enemy will have to hunt for the proper frequency of signal to operate said receivers and he will know when he has found the proper frequency only if the aircraft responds as he varies the frequency of his signal. Thus, if the aircraft flies straight ahead at full speed when he tunes to the proper frequency, the enemy will have no definite clue and may try some other range of frequencies.

As mentioned, when motor 52 turns arm 61 to either end of its desired travel, said arm is released from the member of contact 55 and returns to its middle position. Thus, if a continuous signal from the enemy is received by receiver 46, rudder 4 will assume its middle position under the action of springs 8 and remain there until the operator moves lever 15 to its middle position to re-connect arm 61 with contact 55. It will be understood that contact 55 is driven thru gears from motor 52, and that said contact serves to drive said arm thru pin 63.

Similarly, when receiver 48 receives the strong continuous signal from the enemy, elevators 5 will assume their middle position under the action of springs 9 and will remain there until the operator assumes control over them. Likewise, when receiver 47 receives the strong signal, motor 52 will slow down momentarily, then when arm 61 is released it will gain full speed under the tension of spring 7. Of course, if no signal should be received by said receivers, a similar result would ensue, motor 52 rotating in the opposite direction until arm 61 is released.

As mentioned, motor 52 tends to reverse twice for each impulse. I prefer to produce said impulses frequently so that the reverse rotations will be of brief duration and hence of slight amplitude. However, they must not be so frequent that relay 49 will not have time to respond to them. I find that, for many purposes, it is advantageous to connect said motor to the object to be controlled by a gear train, such as gear train 56, having a high ratio. The slight reversed rotations of motor 52 will then be of an inconsequential amplitude when transmitted to the controlled device.

It will be understood that the expression "modulate a transmitter," as used herein, is intended to include the complete interruption of the signal, as well as a reduction of the intensity of the signal or a change of its frequency to reduce its effect on the receiver, these being well-known methods of modulation.

If my invention is to be used with wire circuits, where radio is unnecessary, points 27 and 28, together with a suitable battery may be connected in series with relay 49. Inasmuch as this will be apparent to an ordinarily skilled person after reading the present disclosure, I have not illustrated it.

I have shown motor 52 with a separately excited field. If desired, a permanent magnet field might be used, or any other arrangement whereby the motor will reverse upon a reversal of its power supply.

I claim:

1. In a remote controlled mobile object having direction controlling devices, a separate motor driven mechanism for each controlling device, each receptive to and actuated by a separate signal and provided with means tending to return said mechanism to a predetermined point when said mechanisms, respectively, are actuated by a signal of greater than predetermined amplitude.

2. In a remote controlled mobile object having direction controlling devices, a separate motor driven mechanism for each controlling device, each receptive to and actuated by a separate signal and provided with means tending to return said mechanism to a predetermined point, and provided with a disengageable clutch element adapted to be thrown out of engagement at limits from said predetermined point and engageable again when said mechanism returns to said predetermined point.

3. In a self-propelled remote control mobile object having direction and speed controlling devices, a separate motor driven mechanism for each controlling device, each receptive to and actuated by a separate signal and provided with means tending to return said mechanism to a predetermined point when said mechanisms, respectively, are actuated by a signal of greater than predetermined amplitude.

4. In combination with a mobile object a control including an electrically operated device characterized by having a relay circuit receptive to and energized in corresponding phase by interrupted electric impulses, thereby to make said control independent of the amplitude of said impulses and remote actuating apparatus including an impulse producing and sending means having an adjustable device for varying the duration and spacing of the electric impulses thereby to vary correspondingly the operation of said control.

5. In combination with a mobile object a control including an electrically operated device characterized by being receptive to and energized by interrupted electric impulses, and remote actuating apparatus including a motor driven, cam-actuated, make-and-break having a manually selective adjustable device for varying the duration and spacing of the electric impulses thereby to vary correspondingly the operation of said control.

6. In combination with a mobile object a control including an electrically operated device characterized by being receptive to and energized by interrupted electric impulses, remote actuating apparatus including an impulse producing and sending means having an adjustable device for varying the duration and spacing of the electric impulses thereby to vary correspondingly the operation of said control, and a clutch mechanism in said control adapted to be disengaged automatically when it is actuated past a fixed point and means for returning it to a neutral position.

7. In combination with a mobile object a control including a reversible electric motor having reversible power circuits characterized by being receptive to and energized by interrupted electric impulses, remote actuating apparatus including a distant impulse producing and sending means having an adjustable device for varying the duration and spacing of the electric impulses thereby to vary correspondingly the operation of said control, and inversely balanced resistance elements in electrical series with the power circuits leading to said motor to maintain said motor in any angular position to which it has been rotated.

8. In combination with a mobile object a control including a reversible electric motor having reversible power circuits characterized by being receptive to and energized by interrupted electric impulses, remote actuating apparatus including an impulse producing and sending means having an adjustable device for varying the duration and spacing of the electric impulses thereby to vary correspondingly the operation of said control, and inversely balanced resistance elements in electrical series with the power circuits leading to said motor, said resistance elements having movable contacts electrically connected therewith and physically joined to a rotatable member actuated by said motor and being operatively arranged to maintain said motor at any angular position to which it has been rotated.

9. In combination with a mobile object a control including a reversible electric motor having reversible power circuits characterized by having a relay circuit receptive to and energized by interrupted electric impulses, thereby to make said control independent of the amplitude of said impulses, remote actuating apparatus including a motor driven make-and-break having an adjustable device for varying the duration and spacing of the electric impulses thereby to vary correspondingly the operation of said control, a clutch mechanism in said control adapted to be disengaged automatically when it is actuated past a fixed point and means for returning it to a neutral position, and inversely balanced resistance elements in electrical series with the power circuits leading to said motor, said resistance elements having movable contacts electrically connected therewith and physically joined to a rotatable member actuated by said motor and being operatively arranged to maintain said motor at any angular position to which it has been rotated.

10. In a remote controlled mobile object having direction controlling devices, a separate motor driven mechanism for each controlling device, each receptive to and actuated by a separate signal and provided with means to return said mechanism to a predetermined point when said mechanisms, respectively, are actuated by a signal of greater or less than predetermined amplitude.

NEVILLES E. WALKER.